United States Patent [19]

Ikeda et al.

[11] Patent Number: 5,013,928
[45] Date of Patent: May 7, 1991

[54] OPTICAL EQUIPMENT OF FIBER LASER DOPPLER VELOCIMETER

[76] Inventors: Yuji Ikeda, Maison de Cascade Rokko 205, 111-1 Miyasaka, Suishasindenaza, Nada-ku, Kobe-shi, Hyogo-ken; Tsuyoshi Nakajima, 3-9 Mefuyamate, Takarazuka-shi, Hyogo-ken, both of Japan

[21] Appl. No.: 486,483

[22] Filed: Feb. 28, 1990

[30] Foreign Application Priority Data

Mar. 27, 1989 [JP] Japan .................................. 1-76078

[51] Int. Cl.$^5$ .......................... G01N 15/06; G01P 3/36
[52] U.S. Cl. ..................................... 250/574; 356/28.5
[58] Field of Search ................ 250/574; 356/335, 336, 356/337, 338, 339, 340-349, 350-353, 27, 28, 28.5

[56] References Cited

PUBLICATIONS

S. L. Kaufman and L. M. Fingerson, *Fiber Optics in LDV Applications*, International Conference on Laser Anemometry-Advances and Applications, 16th-18th Dec. 1985, Manchester, U.K.

*Primary Examiner*—David C. Nelms
*Assistant Examiner*—LaCharles P. Keesee
*Attorney, Agent, or Firm*—Thompson, Hine and Flory

[57] ABSTRACT

A beam expander is used with a perforated concave lens and a plano convex lens to expand a beam diameter to make a small measurement volume to increase an intensity of light scattered, which contributes a reduction of a number of an optical components and a complicated optical adjustment, and makes a small probe diameter. The perforated part of the expand lens plays a role of a space filter to cut off troublesome light scattered when a beam passes through a lens. A three points supporting mechanism adjustment of the focused beam positioning into the fiber core and the incident beam aperture adjustment in the fiber's numerical aperture are used. A high resolution of the adjustment is achieved so that a high transmitting efficiency of a laser power into the fiber is achieved.

10 Claims, 7 Drawing Sheets

OPTICAL EQUIPMENT OF FIBER LASER DOPPLER VELOCIMETER

BACKGROUND OF THE INVENTION (a) Field of the Invention

This invention relates to an optical equipment of a laser Doppler velocimeter which utilizes an interference of two laser beams to measure velocity, for example flow in a pipe, combusting flow, flow in a engine, and so on. Especially, this invention relates a optical equipment of a fiber laser Doppler velocimeter probe and an optical equipment of a manipulator to transmit a laser into a fiber.

(b) Description of the Prior Art

Generally, in laser Doppler velocimeters, a laser beam is split into two beams and collimated. These two beams are focused by a front lens and form a measurement volume wherein an interference fringe are made. A particle in flow, for example a dust, traveling the measurement volume causes scattering light, which is detected at a photomultiplier and transformed into electric Doppler burst signals. The velocity of the flow is obtained by processing the Doppler signal by a signal processing system.

In fiber LDVs, optical fibers are used to transmit laser power to a measurement volume and to transmit a scattered light to a photomultiplier.

As fiber LDV probes, a compact type of the fiber LDV probe as shown in FIG. 6 comprises a Selfoc microlens to collimate the laser beam, front lens, c, to focus two or four beams and make measurement volume, o, receiving lens to collect scattering light from the measurement volume and focus on the end of a receiving fiber, e, and a receiving fiber to transmit the scattered light to a photomultiplier. While, a large type fiber LDV as shown in FIG. 7 comprises a Selfoc micro lens, b, b, to collimate the laser beams out of the fibers, beam expander lens, g, h, to expand a beam diameter to increase the scattered light intensity, front lens, receiving lens, and a receiving fiber.

In a compact type of fiber LDV, a beam out of a Selfoc micro lens can not be expanded due to its compact size so that the measurement volume becomes large which decrease a signal-to-noise ratio. Furthermore, the troublesome light scattered when laser beam passes through a lens causes noise and decrease an accuracy of the measurement. A space filter to cut off the troublesome light scattered can not be used in the compact fiber LDV due to its size.

In a large type of fiber LDV probe, a beam expander is used to make the beam diameter large to make the measurement volume small to increase a light scattered intensity and a complicated adjustment of an optics is required.

At a manipulator, a focused laser beam has to be positioned in a core of a fiber, a, as shown in FIG. 5, so that three dimensional traversings, x, y, z, and two angle adjustments, 0, are required. Since the core diameter of the fiber is 3 to 4 um, a resolution of the adjustment of less than one micron is needed which can hardly be achieved even using a micro meter. Especially, a polarization preserving single mode fiber has small numerical aperture, NA. This means that when a laser beam focused to transmit laser power into a fiber the focused diameter has to be smaller than the core diameter of the fiber and NA of the focusing laser beam has to be smaller than the fiber's NA.

SUMMARY OF THE INVENTION

The principle object of this invention is to realize a beam expander with a perforated lens to increase a SN ratio and decrease a number of an optics, a complicated adjustment of an optics, and a probe diameter. The use of the perforated concave lens and plano-convex lens combination as a beam expander contributes to make a measurement volume small for high scattered light intensity, to cut off troublesome light scattered when a laser beam passes through a lens, that is, a space filter.

A three point supporting mechanism to tilt an end of a rod glass and a tube in which a lens and a fiber are fixed enables us a high resoution adjustment by commercially available screws, so that a high coupling efficiency can be achieved.

To attain the above-mentioned object, this invention was done both in a fiber LDV probe and a manipulator. In the fiber LDV probe, the transmitting fibers, 4, 4, having Selfoc microlens, 41, 41, are collimated and installed. The perforated concave lens, 32, the receiving plano-convex lens, 33, and the front lens, 34, are installed in the probe casing, 31 in the same axis. The laser beam, 12, 12, out of the Selfoc microlens, 41, 41, pass through an outer part of the perforated lens, 32a, while the collected light scattered when a particle pass through the interference fringe of the measurement volume pass through the center part of the perforated lens, 32b. This hole works as a space filter.

In the manipulator, the other end of the transmitting optical fiber mentioned-above is connected to the manipulator, 2. The manipulator comprises a fiber connection part, a tube, 24, in which the focusing lens, 24a, and the fiber, 4, are fixed, and the glass rod, 23, to introduce the laser beam, 12, to the focal lens, 24a, with the same optical axis. The ends of the tube, 24, and the glass rod, 23, having the three point supporting mechanism are tilted by the adjusting screws, 27a, 27b, 29a, and 29b, in order to change a beam incident angle to the focal lens and an incident beam position at the focal lens.

In the above arrangement of the probe, the laser beam, 12, out of the Selfoc microlens, 41, are expanded with its beam diameter and the beam distance, then focused by the front lens, 34, to make the measurement volume. When a particle travels the interference fringe of a measurement volume, a scattered light occurs. This scattered light is collected by the front lens, 34, and focused on the end of the receiving fiber, 51, by the receiving lens, 33, passing through the perforated part of the expand lens, 32b. The use of the perforated beam expander contributes to the reduction of the number of the optics, the simplicity of the optics assembly and its adjustment, and the compactness of the probe. Furthermore, the hole plays a role in the effective space filter for the receiving optics to cut off the troublesome light scattered at the lens surfaces when laser beams pass through it, and the effective receiving aperture. The expanded large beam diameter incident on the front lens, 34, furnishes a small measurement volume which increases the scattered light intensity for increasing the SN ratio and the measurement accuracy.

In the manipulator, laser power is transmitted into fibers, 4, 4. The adjustments of the tube, 24, and the rod glass, 23, are carried out by the commercially available screws installed at the end of the bodies. The front parts have rotational mechanism such as a gyroscope so that the two directional adjustments of the angle of the tube and the rod glass work for the beam positioning and the incident angle changing to the front lens to adjust the focused beam into the core of the fiber. This adjustment mechanism has a high resolution of the beam spot positioning of less than 1 μm. This invention can increase a coupling efficiency using this mechanism.

BRIEF DESCRIPTION OF THE DRAWING

The nature and the advantage of the present invention will be made more apparent from the following description made with reference to the accompany drawing, in which.

DETAILED DESCRIPTION OF THE INVENTION

A description is made below of a detailed description of the present invention, with reference to the accompany drawings.

Figure 1:
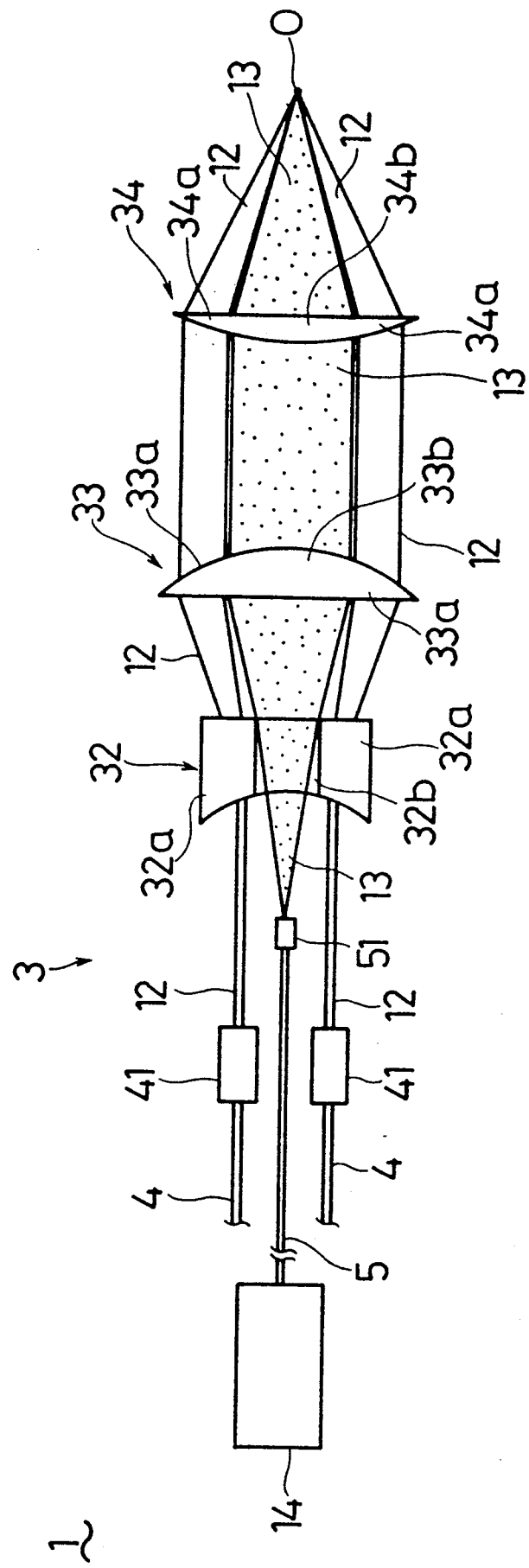
FIG. 1 shows a conceptional layout of the fiber LDV probe, and a detailed schematic layout of the optical components is shown in FIG. 2.
Figure 2:
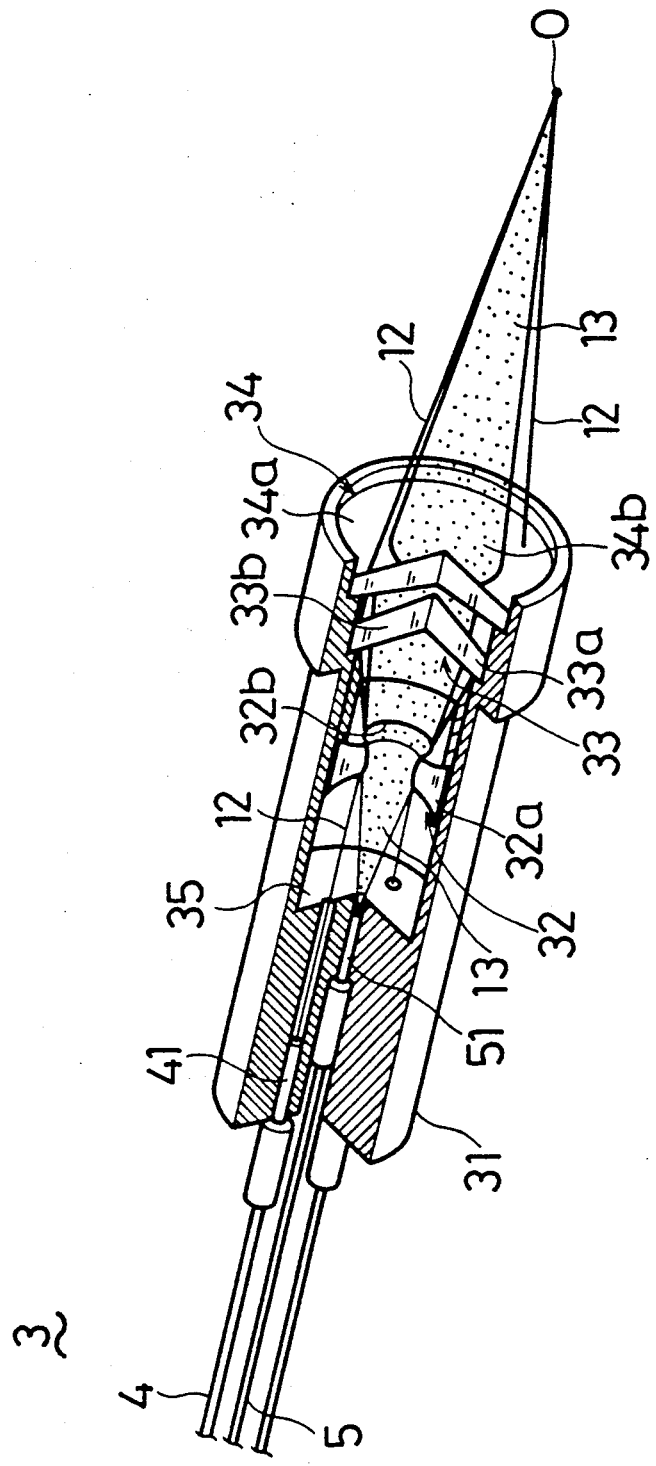
Figure 3:
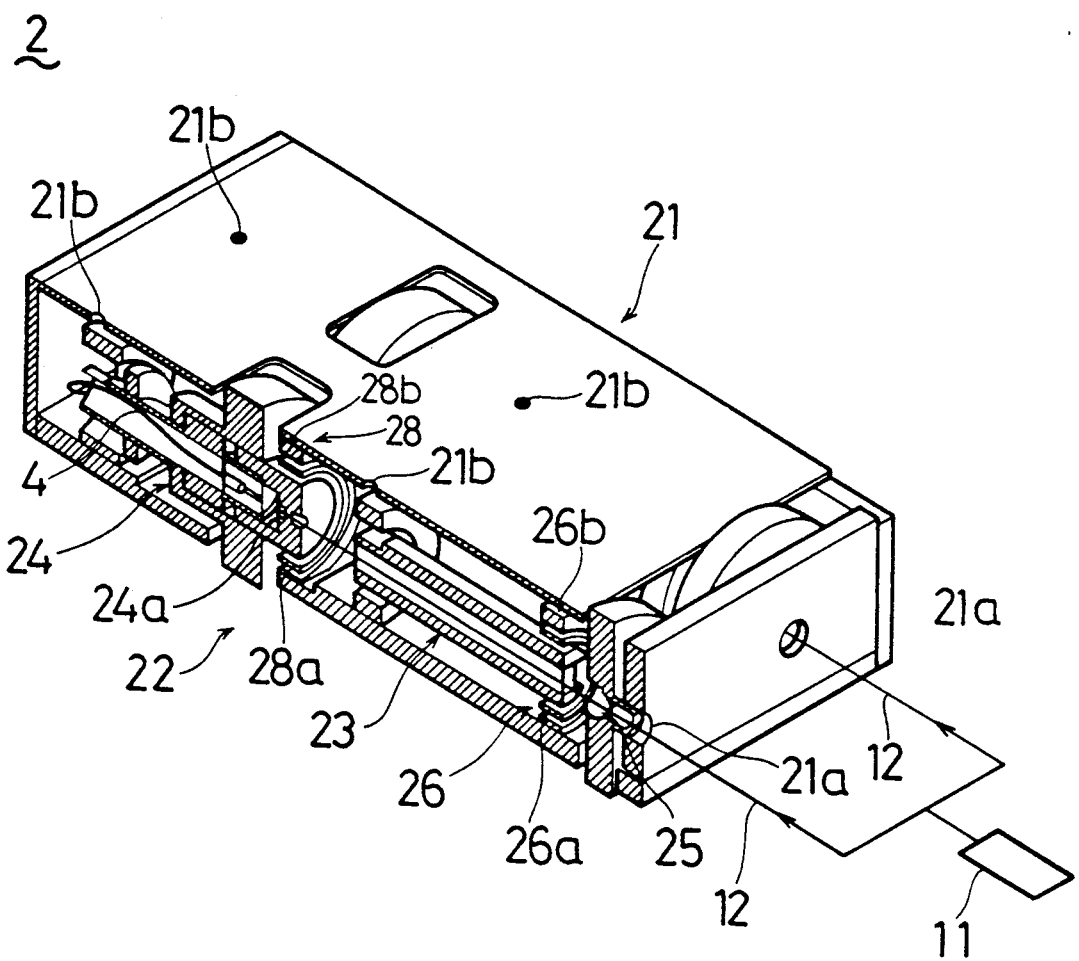
FIG. 3 is a detailed schematic layout of the manipulator and a detailed explanation of the adjustment mechanism is shown in FIG. 4. The positioning of the focused laser beam into the fiber core in the three directions and two angle adjustments are shown in FIG. 5.

Referring to FIGS. 1 to 3, the optical system of the fiber LDV probe comprises the two transmitting fibers, 4, 4, having Selfoc microlens, 41, 41, a receiving fiber, 5, and the three lens, 32, 33, and 34. A laser beam out of the laser source, 14, is split into two beams and transmitted into the fibers, 4, 4, at the manipulator, 2. The two laser beams out of the Selfoc microlens, 41, 41, are expanded at the beam expander, 32, 33, and focused at the measurement volume, o, by the front lens, 34. The scattered light, 13, generated when a particle passes through the interference fringe of the measurement volume, 0, are collected by the front lens, 34, and focused on the end of the receiving fiber, 51, by the receiving lens, 33, and transmitted to a photodetector, where a light signal is transformed into a electrical signal. A velocity of the flow is obtained by processing the electrical Doppler signals.

The explanation of the fiber LDV probe, 3, mentioned-above is in the following:

The two transmitting fibers, 4, 4, and one receiving fiber, 5, are connected at the end of the probe. The other ends of the transmitting fibers, 4, 4, are connected at the manipulator, 2, to transmit laser power, and the other end of the receiving fiber is connected at a photomultiplier to transmit the scattered light from the measurement volume, 0.

The fiber LDV probe, 3, comprises the casing, 31, the two transmitting fibers, 4, 4, one receiving fiber, 5, the expand lens, 32, 33, and the front lens, 34. The casing is a rod dimension. The fibers having Selfoc microlens, 41, 41, to collimate the laser beams are installed in parallel. The axis of the two Selfoc microlens is the same.

The expand lens combines the perforated concave lens, 32, and the plano convex lens, 33, and these two lens are fixed in the same axis. The expander is used to expand the beam diameter and the beam distance. The scattered light is collected by the front lens, 34, and focused on the end of the receiving fiber, 51, passing through the perforated part of the lens, 32b. This perforated part works for the space filter to cut off the troublesome light scattered when a beam passes through the lens. The second expand lens, 33, works for the expander of the incident beam and for receiving and focusing the light scattered on the fiber end. This is the reason why this invention can decrease the number of the optics and install a beam expander in such a small probe diameter.

The front lens, 34, mentioned above is a plane convex lens. The outer part works for focusing a beam and make the measurement volume, o, and the inner part works for receiving of the light scattered from the measurement volume, o.

Figure 4:
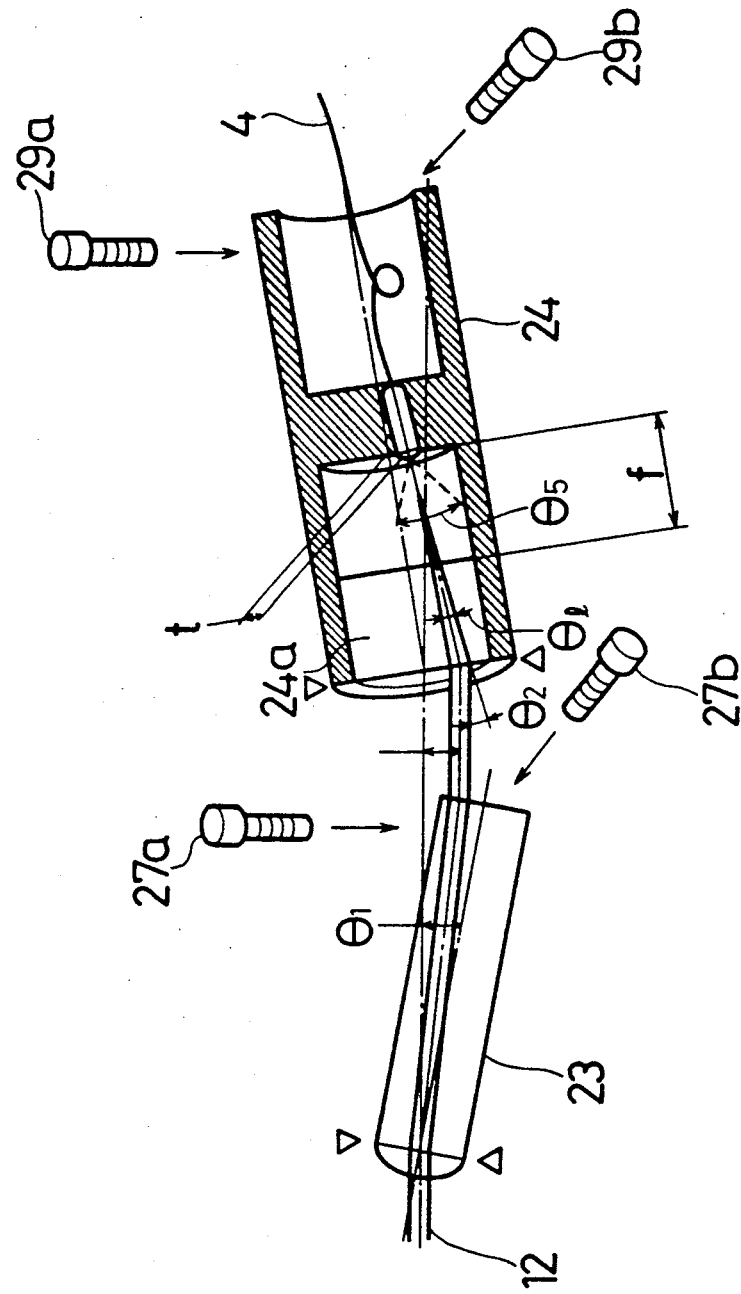

The explanation of the manipulator to transmit laser power into a fiber is in the following;

The manipulator consists of a pair of the transmitting equipments, 22, 22, in the rectangular casing, 21. The transmitting equipment comprises the laser beam introducing hole, 21a, the half-wave plate, 25, to corresponds a polarization direction of a laser beam to that of the fiber, the glass rod, 23, to adjust a numerical aperture of a incident beam into the fiber's numerical aperture, the focusing lens, 24, and the transmitting fibers, 4, 4. The glass rod having an anti-reflection coating on both ends has a length of 80 mm in order to separate the first order shifted beam to the zero order shifted beam. An adjustment is carried out by the three point supporting mechanism, 27, by tilting the end of the body, 23. The front part is a gyro mechanism, 26, having the two screws, 27a, 27b, as shown in FIG. 4. The focusing lens, 24a, and the receiving fiber, 4, are installed in the supporting tube, 24. The laser beam out of the glass rod is introduced to the fiber, 4, by adjusting, with the same three point supporting mechanism, 24, and the gyro mechanism 28. The front part, 28, is a gyro mechanism and the rear part is a three point supporting mechanism with the screws, 29a, 29b, and a spring.

The gyro mechanisms, 26, and 28, mentioned above comprise inner rings, 26a, 28a, and outer rings, 26b, 28b, and supports the glass rod and the tube. The adjusting screws of M3 (pitch=0.5 mm), 27a, 27b, 29a, and 29b, are mounted normally to the center axis of the casing, 24 and the angle between these two screw is 90 degree. Adjusting the end of the tube in which the focusing lens, 24a, and the fiber, 4, are installed, in the two directions by these screws, the focused beam positioning is done to be in the core of the fiber, 4.

Here, the principle of the adjustment is explained in the followings;

As shown in FIG. 4, the positioning of the focused beam into the core of the fiber is performed by changing the incident beam angle $\theta_2$ on the focusing lens, 24a, by tilting the end of the tube in the two directions with the screws, 29a, 29b. The distance, t, is defined as t=f tan $\theta_2$ (f: focal length) in a Gaussian optics. The angle $\theta_2$ is changed by tilting the end of the tube, 24, in the same method.

In order to achieve a high incident efficiency, the following the conditions should be satisfied; (i) the focused beam diameter $d_l$ is smaller than the core diameter of 4 μm, $$d_l < d_f \tag{1}$$

and (ii) the numerical aperture of the incident beam $NA_1(\theta_l)$ is smaller than that of the fiber $NA_f(\theta_f)$, that is, $$\theta_l < \theta_f \tag{2}$$

From the relations between the focused beam diameter, $$d_l = 4f\lambda/\pi d_{in} \quad (3)$$

and the numerical aperture, $$NA_l = d_{in}/2f \quad (4)$$

The following equation is defined;

$$Na_l = 2\lambda/\pi d_l \quad (5)$$

where f is a focal length of the lens, 24a, is the wavelength, and $d_{in}$ is the beam diameter at the front lens, 24a. When the wavelength of the laser is 632.8 nm and a polarization preserving optical fiber (Hitachi) of 4 um in core diameter and 0.1324 in $NA_f$ is used, the conditions (i) and (ii) are rewritten as, $$3.04 \ \mu m < d_l < 4 \ \mu m \quad (6)$$

$$0.10 < \sin \theta_l < 0.1324 \quad (7)$$

These inequalities are reduced to the following condition with respect to the focal length of the lens:

$$4.14 \ mm < f < 5.46 \ mm \quad (8)$$

Figure 5:
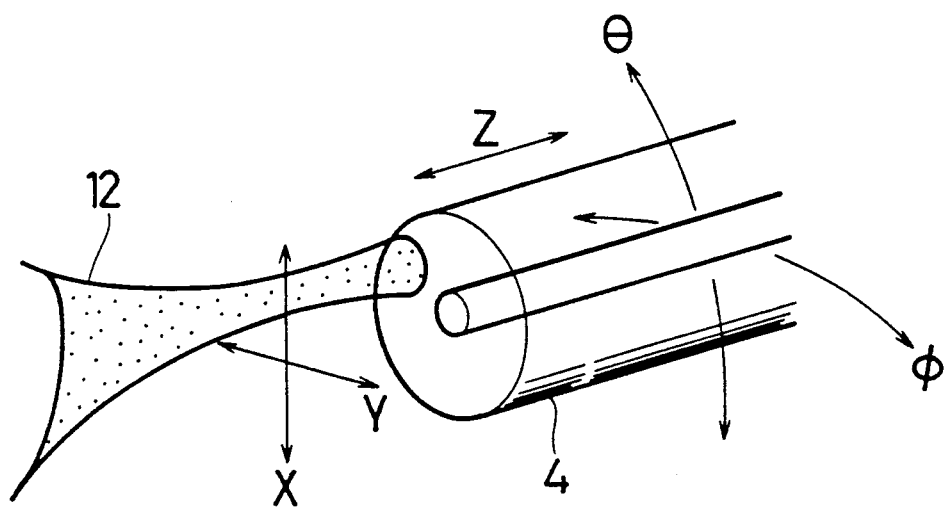
Figure 6:
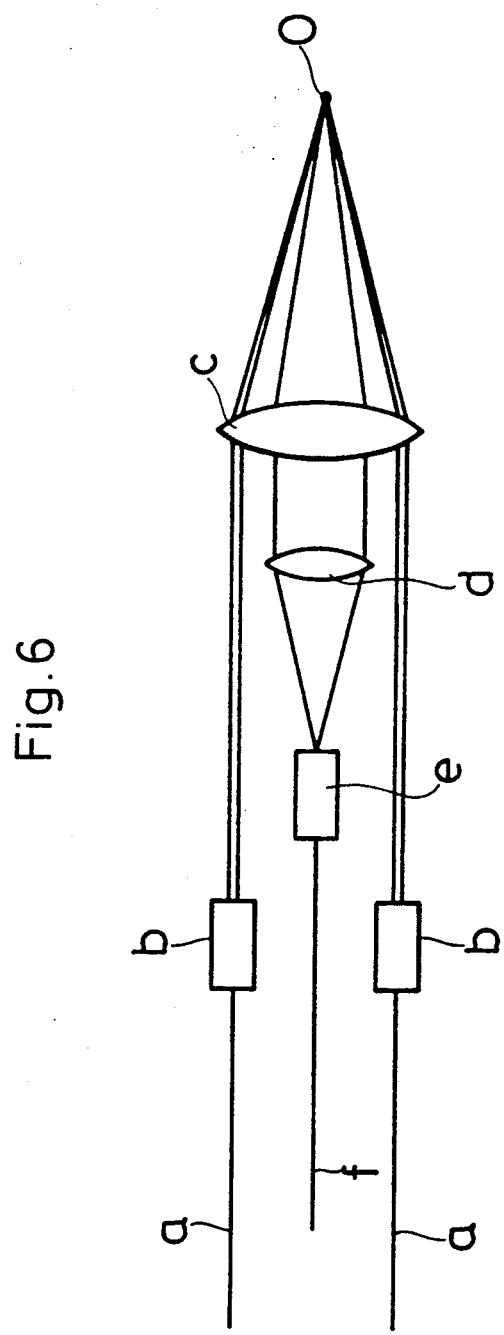
FIGS. 6 and 7 are the schematic layouts of the conventional fiber LDV probes.
Figure 7:
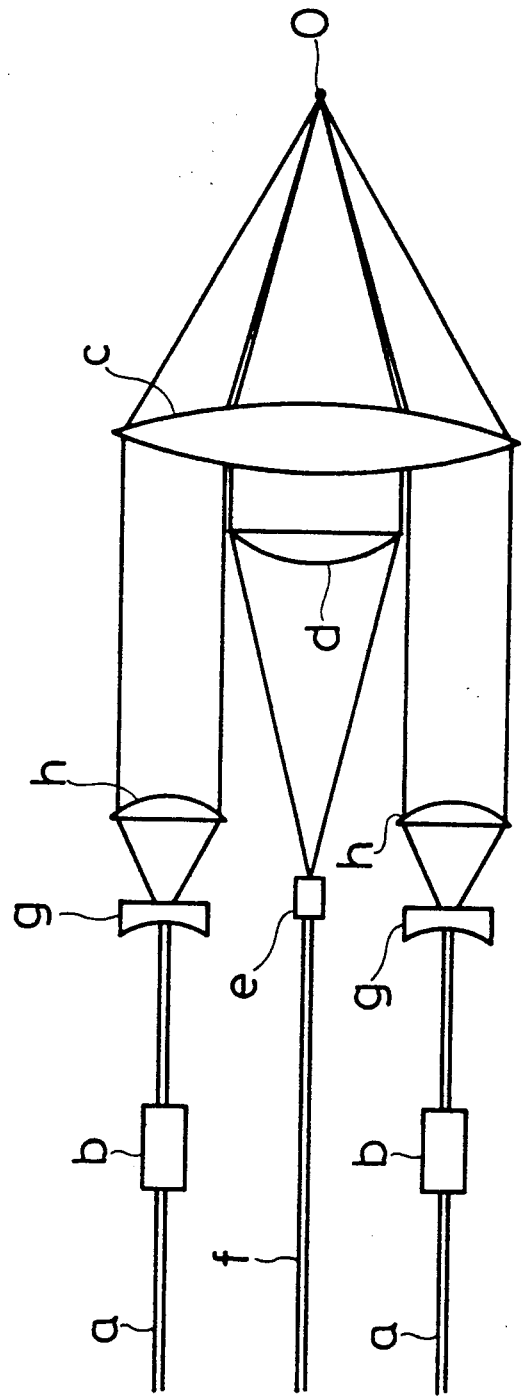

The manipulator requires five degrees of freedom in adjustment as illustrated in FIG. 5. The adjustments of x and y directions are carried out by changing the incident beam angle to the focusing lens with the three point supporting mechanism as shown in FIG. 4.

In order to position of the focused beam into the core of the fiber and obtain a high transmitting efficiency, a high resolution of the adjustment is inevitable. This invention achieves the high transmitting efficiency using the manipulator of 0.3 $\mu$m resolution in the x and y direction, 4 $\mu$m in the z direction, and $5.3 \times 10^{-4}$ degrees in $\theta$ and $\phi$ directions which corresponds to 1/250 of the fiber's $NA_f$.

The explanation of an effect of the fiber LDV is in the followings;

The laser beam out of the laser source, 14, is split into two beams and each beam passes through the half-wave plate, 25, glass rod, 23, focusing lens, 24a, then transmitted into the fiber, 4. The output beam from the fiber is collimated at the Selfoc microlens, 41, passes through the expand lens, 32, 33, and made cross to make the measurement volume, o, by the front lens, 34. The interference fringe is made at the beam crossing point. When a particle travels the interference fringe, light is scattered whose frequency corresponds to the Doppler frequency of the flow. The light scattered is collected by the front lens, 34, and focused on the receiving fiber end, 51, by the receiving lens, 33. The light scattered is transmitted to the photodetector and the velocity is calculated from the frequency at the signal processor, 14.

Since the perforated beam expander is used to expand the beam diameter to increase the SN ratio and the accuracy of the measurement, this invention reduces the number of the optical components and the complicated adjustment of the optics, and makes the probe diameter small compared with the conventional LDVs. Furthermore, a small measurement volume is achieved by expanding the incident beam diameter to the front lens. For example, a diameter of the measurement volume of 71.2 $\mu$m is formed when a focal length of the lens is 50 mm, but an only 149 $\mu$m in the conventional small fiber LDV. Thus, the light scattered intensity is increased and the SN ratio and the accuracy of the measurement is increased. Moreover, the perforated part of the expander lens plays a role of a space filter to cut off the troublesome light scattered when a beam passes through a lens.

The dimensions of the measurement volume made in this invention are described in Table 1. The spot diameter of 71 $\mu$m is almost half value of those in commercially available fiber LDVs with comparable focal length. In terms of the SN ratio, this fiber LDV is estimated from the following relation:

$$SN \ ratio = (As)\{(nq \ Po)/(\Delta f)\}\{(Da \ d_{in})/(Ra \ f)\}^2 \quad (9)$$

As: Constant
Da: Receiving aperture
$d_{in}$: Beam diameter incident to the front lens
f: Focal length of the front lens
$\Delta f$: Bandwidth
Po: Laser power
Ra: Receiving length
nq: Quantum efficiency of photodetector Here, $\{(Da \ d_{in})/(ra \ f)\}^2$ is used to estimate the performance of the fiber LDV. Compared with the parameters of $0.72 \times 10^{-6}$ or $0.29 \times 10^{-6}$ or $0.6 \times 10^{-6}$ of the conventional LDVs, this invention increases the parameter up to be $6.32 \times 10^{-6}$, this is almost ten times as good as those of the conventional LDVs.

In the manipulator, the beam spot positioning and the angle adjustment are performed accurately and quickly. When an angle resolution of a manual adjustment of the screw is five degree, the resolution of the positioning of the focused beam is to be 0.3 $\mu$m and the coupling efficiency of 80% is achieved. It is found this coupling efficiency of 80% is very high compared with the calculated efficiency of 88.1% taking the truncation lass and the reflection loss into account.

Two dimensional measurement probe is realized when four fibers are used to transmit the four beams to make a two dimensional measurement volume.

Furthermore, the adjusting screw is not restrict to be M3 (pitch=0.5 mm), and a spring to support the tube and the glass rod is not restricted to be one.

TABLE 1

| | Dimensions of Measurement Volume | | | | | |
|---|---|---|---|---|---|---|
| | Developed FLDV | Conventional LDV(DANTEC) | Conventional LDV(DANTEC) | FLDV (DANTEC) | FLDV (TSI) | FLDV (KANOMAX) |
| Wavelength (nm) | 632.8 | 632.8 | 488.0 | 632.8 | 632.8 | 632.8 |
| Focal length (nm) | 50 | 310 | 310 | 50 | 60 | 60 |
| Probe diameter (nm) | φ18 | φ120 | φ120 | φ14 | φ14.22 | φ12 |
| Spot diameter (μm) | 71.2 | 227 | 79.5 | 149 | 140 | 130 |
| Spot length (mm) | 0.62 | 2.36 | 0.83 | 1.87 | 2.4 | 2.89 |
| Fringe spacing (μm) | 2.77 | 3.28 | 2.53 | 3.97 | 3.87 | 7.1 |
| Fringe number | 25 | 69 | 31 | 37 | 30 | 18 |

TABLE 1-continued

| | Dimensions of Measurement Volume | | | | | |
|---|---|---|---|---|---|---|
| | Developed FLDV | Conventional LDV(DANTEC) | Conventional LDV(DANTEC) | FLDV (DANTEC) | FLDV (TSI) | FLDV (KANOMAX) |
| SNR parameter ($\times 10^{-6}$) | 6.32 | 0.47 | 2.29 | 0.72 | 0.61 | 0.29 |

SNR parameter is $\left(\dfrac{D_a \cdot d_{in}}{r_a \cdot f}\right)^2$.

What is claimed is:

1. An optical equipment of fiber laser Doppler velocimeter, comprising:
   transmitting fibers to transmit laser power,
   a receiving fiber to transmit light scattered; and
   a probe wherein the transmitting fibers and the receiving fiber are connected;
   the probe, comprising;
      a fiber connector of the receiving fiber, fiber connectors of the transmitting fibers,
      a first expand lens mounted in front of the fiber connectors,
      a second expand lens mounted in front of the first expand lens in the same axis; and
      a front lens mounted in front of the second expand lens in the same axis,
   the first expand lens, having
      a perforated part to introduce a scattered light from a measurement volume to the receiving fiber end; and
      an outer part to expand incident beam diameters and its distance,
   the second expand lens, having
      an outer part to collimate the expanded beam diameter and introduce to the front lens; and an inner part to focus the light scattered from the measurement volume on the receiving fiber end,
   the front lens, having
      an outer part to focus the beams and make the measurement volume; and
      an inner part to collect the light scattered from the measurement volume.

2. An optical equipment of fiber laser Doppler velocimeter according to claim 1 further comprising,
   Selfoc microlens connected to the transmitting fibers to collimate laser beams out of the fibers.

3. An optical equipment of fiber laser Doppler velocimeter according to claim 1 further comprising, two ferrules installed in parallel and axissymmetric and the receiving fiber at the center axis of the probe.

4. An optical equipment of fiber laser Doppler velocimeter according to claim 1, whereby two dimensional measurements is realized using four transmitting fibers to transmit four laser beams to the measurement volume.

5. An optical equipment of fiber laser Doppler velocimeter according to claim 1, further comprising a manipulator transmitting a laser power into the transmitting fibers, the manipulator including:
   fiber connectors of the transmitting fibers, fiber coupling equipments wherein the end of the transmitting fiber is fixed,
   an adjusting glass rod to adjust the incident beam aperture into the fiber's numerical aperture,
   an adjusting tube to position the focused beam into the fiber core; and
   three points supporting mechanisms to position the beam spot and to adjust an incident beam angle by tilting the end of the tube and the glass rod.

6. An optical equipment of fiber laser Doppler velocimeter according to claim 5 further comprising two sets of the adjusting glass rod and the adjusting tube.

7. An optical equipment of fiber laser Doppler velocimeter according to claim 5 further comprising two sets of the three points supporting mechanism adjusting tube and the glass rod.

8. An optical equipment of fiber laser Doppler velocimeter according to claim 5 further comprising a half-wave plate to corresponds the laser polarization direction to that of the fiber's polarization direction.

9. An optical equipment of fiber laser Doppler velocimeter according to claim 5 wherein the adjusting glass rod is to separate a first order shifted beam to a zero order shifted beam.

10. An optical equipment of fiber laser Doppler velocimeter according to claim 5 further comprising a gyro mechanism at the front part of the tube and the glass rod having inner and outer rings.

* * * * *